Aug. 28, 1956  E. E. SHELDON  2,761,084
DEVICE FOR INTENSIFYING IMAGES OF INVISIBLE RADIATION
Filed March 30, 1949  3 Sheets-Sheet 1
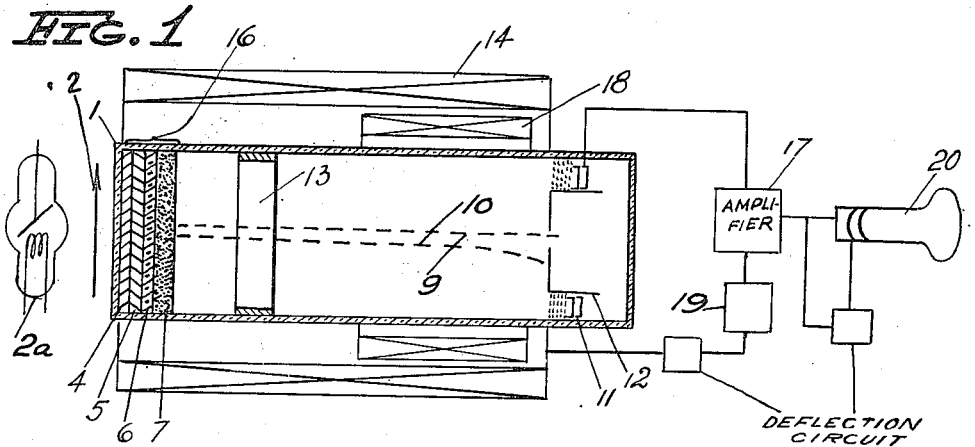
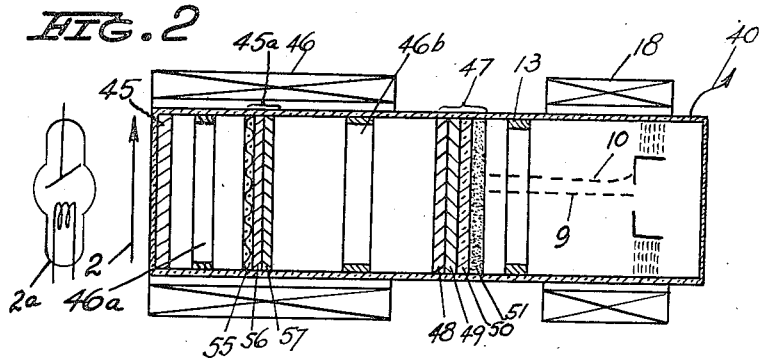
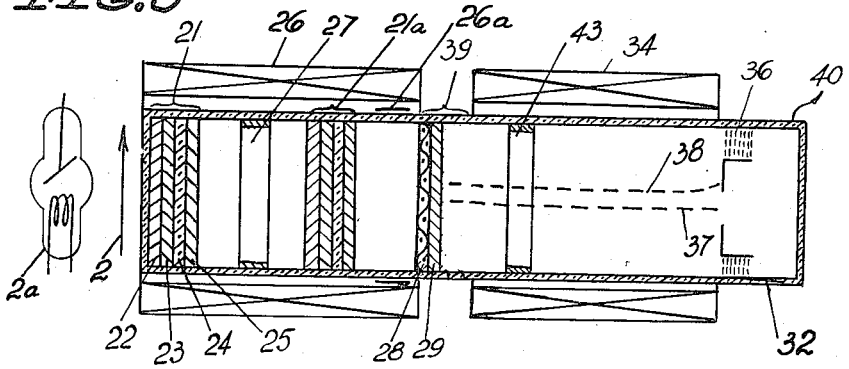
INVENTOR.
EDWARD EMANUEL SHELDON
BY Julian J Wittal
ATTORNEY Aug. 28, 1956 E. E. SHELDON 2,761,084
DEVICE FOR INTENSIFYING IMAGES OF INVISIBLE RADIATION
Filed March 30, 1949 3 Sheets-Sheet 2

INVENTOR.
EDWARD EMANUEL SHELDON
BY Julian J. Wittal
ATTORNEY

Aug. 28, 1956  E. E. SHELDON  2,761,084
DEVICE FOR INTENSIFYING IMAGES OF INVISIBLE RADIATION
Filed March 30, 1949  3 Sheets-Sheet 3

INVENTOR.
EDWARD EMANUEL SHELDON
BY Julian J. Wittal
HIS ATTORNEY

United States Patent Office 2,761,084
Patented Aug. 28, 1956

2,761,084
DEVICE FOR INTENSIFYING IMAGES OF INVISIBLE RADIATION

Edward Emanuel Sheldon, New York, N. Y.

Application March 30, 1949, Serial No. 84,327

13 Claims. (Cl. 313—65)

This invention relates to a method and device for storing images of invisible radiations and refers more particularly to a method and device for storing X-ray images, which term is meant to include other invisible radiations such as gamma rays and the like, and also for images formed by irradiation by beams of atom particles such as electrons or neutrons. This application contains subject matter common with my U. S. Pat. No. 2,525,832.

The primary purpose of this invention is to provide the possibility of storing the invisible images and inspecting them for a desired length of time when wanetd without further expenditure of invisible radiation.

Another objective of this invention is to provide a method and device to produce intensified images for examination. The intensification will make it possible to overcome the inefficiency of the present fluoroscopic examination. At present illumination of the X-ray fluoroscopic image is of the order of 0.001–0.01 millilambert. At this level the human eye has to rely exclusively on scotopic (dark adaptation) vision which is characterized by tremendous loss of normal visual acuity in reference both to the detail and contrast. The intensification of the necessary magnitude can be accomplished only by storing the image of invisible radiation and reading the same for the desired length of time without further expenditure of invisible radiation.

Another objective of this invention is to make it possible to prolong the fluoroscopic examination, since it will be possible to reduce markedly the strength of radiation affecting the patient's body. Conversely the exposure time or energy necessary for examination using an invisible radiation may be considerably reduced. This will be of a great value in the military use of infra-red rays.

Another objective of this invention is to provide a method and device to produce sharper and more contrasting images of invisible radiations than it was possible until now.

The present intensifying devices concerned with reproduction of X-ray images are completely unsatisfactory, because at low levels of fluorescent illumination such as we are dealing with, there is not enough of X-ray photons to be absorbed by fluorescent or photoelectric screens used in such devices. Therefore the original X-ray image can be reproduced by them only with a considerable loss of information. It is well known that the lack of sufficient number of X-ray quanta cannot be remedied by increase of intensity of X-ray radiation as it will result in damage to the patient. This basic deficiency of the X-ray examination was overcome in my invention by using an X-ray exposure of a strong intensity but of a very short duration, and storing the invisible X-ray image for subsequent inspection for the desired length of time without any need of maintaining the X-ray irradiation. The X-ray beam therefore can be shut off while reading the stored X-ray image and in this way the total X-ray exposure received by the patient is not increased in spite of using bursts of great X-ray intensity. The storage of radar signals is well known in the art as evidenced by U. S. Patent No. 2,451,005 to P. K. Weimer and other patents. The novelty of my invention consists of storing the images of invisible radiations and not only invisible signals and what is even more important of storing simultaneously the total images instead of breaking them up into minute point images by scanning in order to be able to store them. Furthermore, in my invention, intensification of stored images is accomplished without sacrificing the detail and contrast of the stored image. This feature is of a great importance especially in X-ray examinations in which without intensification of the order of 1000 the eye is confined to so called scotopic vision at which it is not able to perceive definition and contrast of the fluorescent X-ray image.

The purposes of my invention were accomplished by converting the invisible radiation image into photoelectron image by using the composite photocathode suitable for the particular kind of radiation applied, which photocathodes are described in detail in my co-pending application Serial No. 59,661 filed November 5, 1948, which is now U. S. Patent 2,603,757 granted July 15, 1952. In case of dealing with X-ray radiation said composite photocathode consists of light-reflecting layer, fluorescent layer, separating layer and photo-emissive layer. In case of infra-red radiation is used such composite photocathode has infra-red transmitting visible light reflecting layer such as gold and infra-red sensitive fluorescent layer, separating layer and photo-emissive layer. Instead of a composite photocathode in some instances a simple photocathode consisting of a layer emitting electrons under the influence of radiation applied on a backing plate, may be used. The photoelectron image emitted from the photo-emissive layer and having the pattern of invisible radiation image is intensified by acceleration, demagnification and if necessary by secondary emission, is focused by meaens of magnetic or electrostatic fields on the image storage target of semiconductor or dielectric type and produces a charge image thereon. The stored X-ray image is scanned by an electron beam. The target has a positive charge image on its surface, therefore the scanning beam is neutralized at all image points of the target to a degree depending on the intensity of the charges. The scanning electron beam returning from the target to multipliers is therefore modulated by the charge pattern of the target. The returning beam is intensified by multistage multilpliers and is converted into video signals having the pattern of the original X-ray image. The video signals are transmitted by coaxial cable or by high frequency system to receivers, where they are reassembled and reconverted into a final image with a desired degree of intensification.

The invention will appear more clearly from the following detailed description when taken in connection with the accompanying drawings showing by way of example only preferred embodiments of the inventive idea.

In the drawings:

Fig. 1 represents a sectional diagrammatic view of the invisible radiation sensitive storage pick-up tube;

Fig. 2 represents a sectional view of a modification of the photocathode and of the composite target in the pick-up storage tube;

Fig. 3 represents a sectional view of a modified invisible radiation sensitive pick-up storage tube with a cascade image amplification;

Figure 6:
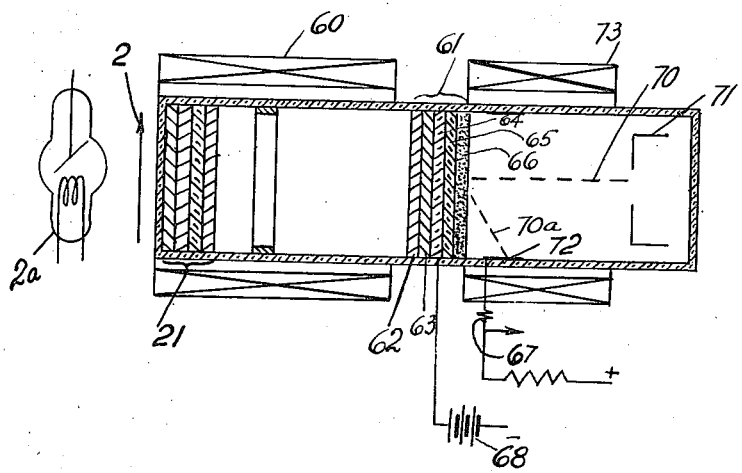
Fig. 6 represents a sectional view of an invisible radiation sensitive pick-up storage tube using high velocity electron beam.

Reference will now be made to Fig. 1 which represents invisible radiation sensitive storage pick-up tube 1. In case the X-ray radiation 2a is used, the composite photocathode 16 will consist of light reflecting conducting layer 4, of fluorescent layer 5, transparent dielectric layer 6 and photoemissive mosaic layer 7, all layers in close apposition to each other. The light reflecting layer 4 may be a very thin layer of aluminum or of other metal and is connected to the outside source of potential. It is obvious that the conducting layer may be used also between the fluorescent and dielectric layers, in which case said conducting layer must be light transparent. The fluorescent layer 5 may be of zinc silicates, sulphides, $ZnO, BaPtSO_4$ or of organic phosphors such as anthracene or naphthalene. The dielectric layer 6 has to be light transparent and to cause no chemical interference with fluorescent or photoemissive layers. Mica, glass, quartz, silicates or plastics of poor electric conductivity are best suitable for this purpose. The storage of the X-ray image depends on the electrical conductivity of said dielectric layer. 30–60 seconds are sufficient for inspection of one X-ray image. This means that the X-ray image has to be stored without deterioration for a period of time which is equivalent to a few thousands of scans. The photoemissive mosaic layer 7 has to be correlated with the emission of the fluorescent layer. Caesium, potassium or lithium or antimony, bismuth or arsenic are suitable materials for photoemissive layer.

In case infra-red radiation is used as a depicting radiation the layer 4 has to be transparent to infra-red rays. A thin layer of gold is very suitable for this purpose. The fluorescent layer 5 may be in such case of alkaline earth selenides or sulphides activated with cerium, samarium or europium, of $ZnSO_4Pb$ or of $CaSPb$ or of lanthanum oxysulphides with activators. The dielectric layer 6 may be of mica, glass, quartz or of plastic of poor electric conductivity. The photoemissive mosaic should be of CsOAg which is the most sensitive in this region of spectrum.

The invisible X-ray image of the object 2 is converted by the fluorescent layer 5 into a fluorescent image. The fluorescent image directly and by reflection from the light reflecting layer 4 passes through the transparent layer 6 and is converted in the photoemissive layer 7 into photoelectron image and then into a charge image. The charge image has the pattern of the original X-ray image and being insulated by the dielectric layer 6 can be stored for a desired period of time. The stored X-ray image is scanned by a slow electron beam 9 emitted from the cathode-ray gun 12. The electron gun is well known in the art and therefore does not have to be described in detail, in order not to complicate the drawings. The scanning electron beam is focussed by the magnetic or electro-static fields 14 and is decelerated by decelerating ring electrode 13 so that the scanning electrons land on the mosaic 7 with velocity approaching zero volts. The mosaic has a positive charge image on its surface, as was explained above, therefore the scanning beam is neutralized at all image points of mosaic to a degree depending on the intensity of their charges. The returning electron beam 10 is therefore modulated by the charge pattern of the mosaic. The returning beam is intensified by multi-stage multiplier 11 and is converted thereafter into video signals having the pattern of the original X-ray image. The deflecting fields 18 for scanning motion of the electron beam and synchronizing circuits 19 are not illustrated in detail as they are well known in the art. The video signals are transmitted by coaxial cable or by high frequency system to amplifiers 17 and therefrom to receivers 20, where they are reassembled and reconverted into a final image with a desired degree of intensification. The final X-ray image can be examined for a desired length of time as it is available as long as the charge image is present on the mosaic. The action of the decelerating and focusing fields 13 and 14 is of intermittent character. At the time of the X-ray exposure these fields are inactive. When the stored X-ray image is to be read the fields 13 and 14 are activated, so that the scanning electron beam 9 can be decelerated and focused on the mosaic layer 7.

After the examination of the X-ray image has been concluded, the composite photocathode 16 has to be restored to its original condition before the next X-ray image can be stored. The mosaic layer 7 at the end of the reading has remaining positive charges thereon. In order to neutralize these charges, I spray the mosaic with the electron beam from the gun 12 with velocity at which secondary electron emission ratio of the mosaic is below unity. This requires only change in potential of fields 13 and 14, so that electrons have the necessary velocity when striking the mosaic. In this way the mosaic can be fast restored to the original condition.

Instead of the composite photocathode 16 in some cases a simple photocathode of the material emitting electrons under X-ray irradiation may be successfully used. Such a cathode 45 can be made from lead, uranium, bismuth or gold and is shown in Fig. 2. The photoelectron image having the pattern of the X-ray image is accelerated and focused by the action of magnetic or electrostatic fields 46 and 46a on the secondary electron emissive electrode 45a which consists of electron transparent wide mesh supporting screen 55 having thereon a coating of a thin electron transparent layer of metal such as of aluminum or silver 56 and of a thin secondary electron emissive layer 57 such as of glass, quartz, or of a suitable metal such as Be, Mg, or Ni. The photoelectrons from the photocathode 45 produce secondary electrons which because of their velocity can escape from the electrode 45a from the side opposite to the source of the primary photoelectron beam. The secondary electron beam is accelerated by the field 46b and is focused on the composite storage target 47. The target 47 consists of electron transparent, light reflecting layer 48, fluorescent layer 49, transparent dielectric layer 50 and of photoemissive mosaic 51. The photoelectron image produces in the photoemissive mosaic 51 a charge image having the pattern of the original X-ray image. Otherwise this pick-up storage tube operates in the same way as was described above. Instead of composite target 47 a simple target of a thin insulated layer such as of quartz, glass, or a suitable plastic on a supporting screen may also be used. The photoelectrons from the second stage electrode 45a being accelerated by the fields 46a have sufficient energy to penetrate through said target and to produce a charge image having the pattern of the original X-ray image on the opposite side of the insulating layer. In some cases it is advantageous to provide the insulating target also with a thin metallic backing layer.

In order to increase sensitivity of this novel pick-up storage tube, I make a modification shown in Fig. 3. The invisible X-ray image of the object 2 is projected onto composite cathode 21 having light reflecting layer 22, fluorescent layer 23, chemically inactive separating transparent layer 24 and photoemissive layer 25. The X-ray image is converted by said photocathode into photoelectron image, the photoelectron image is focused and accelerated by magnetic or electrostatic fields 26 and 27 on the second stage composite screen 21a as described in detail in my United States Patent No. 2,555,424 filed on March 9, 1948. The intensified photoelectron image produced by the second stage composite screen 21a is accelerated by field 26a and is focused on the target 39 consisting of a metallic backing wide mesh screen 28 and a thin dielectric layer 29 such as of quartz or a suitable plastic. The photoelectrons from the composite screen 21a have sufficient energy to penetrate through said metallic layer 28 and dielectric layer 29 and to produce a charge image having the pattern of the original X-ray image on the opposite side of the insulating layer, where it can be scanned by the electron beam 37. Instead of this target a composite target 47 shown in Fig. 2 may also be used. This arrangement gives additional intensification by the factor of six to ten times. Further intensification can be achieved by electron-optical demagnification of the photoelectron image from the composite photocathode 21 before projecting it on the target 39. This intensification is proportional to the square of the linear diminution and may amount to the factor of ten to twenty. The rest of the operation of the pick-up storage tube 32 is the same as was explained above. The electron beam 37 from the electron gun 35 is decelerated by the ring electrode 43 and is focused by the magnetic or electrostatic fields 34 on the dielectric layer 29. The returning electron beam 38 modulated by the stored charge image on the dielectric layer, is intensified by the multi-stage multiplier 36 and is converted into video signals 40.

Figure 4:
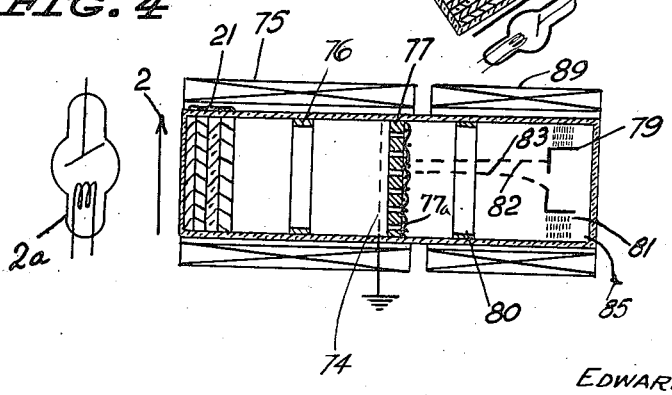
Fig. 4 represents a sectional view of a pick-up storage tube with a perforated storage target.

The best contrast of the stored X-ray image is realized in the pick-up storage tube shown in Fig. 4. In this modification of my invention the invisible X-ray image of the examined object 2 is converted by the composite screen 21 or by the photocathode 45 which have been described above, into a photoelectron image. The photoelectron image is accelerated by the electrode 76 and is focused by the magnetic or electrostatic fields 75 on the perforated target 77 of poor electrical conductivity such as of mica, glass, quartz or of a suitable plastic. The impingement of photoelectron beam of a high velocity causes secondary electron emission from the target 77. The secondary electrons are drawn away by the mesh screen 74 connected to the ground or to the source of the positive potential. As a result a positive charge image is formed on the perforated target 77 having the pattern of the original X-ray image. The target 77 is scanned by a slow electron beam 82 from the electron gun 79. The scanning electron beam is focused by magnetic or electrostatic fields 89 and is decelerated by the ring electrode 80, so that it arrives to the target with a velocity approaching zero volt. The deflecting circuits and synchronizing circuits are not shown in order not to complicate the drawings. A part of the scanning electron beam passes through the perforations in the target 77. The charge image on the target 77 controls the passage of the scanning electron beam acting in the similar manner to a grid in the electron tube. The remaining part of the scanning electron beam 83 returns to the multiplier section 81. This part of the electron beam is also modulated by the charge image on the target 77 but is of reverse polarity. The returning electrons are brought to the multistage multiplier 81, are multiplied there and then are converted into video signals 85. The resolution of the stored image may be improved by making the storage target 77 as thin as possible. For this purpose the following target construction is adopted. The storage target in this modification consists of a supporting mesh screen 77a on which a very thin layer of dielectric such as quartz or glass is deposited in such a manner that the openings of the mesh screen remain unobstructed. With such a target which may be 1 micron thin, the photoelectrons from the photocathode 21 when given a proper velocity may pass on the opposite side of the target and form a charge image on the side facing the scanning beam.

Figure 5:
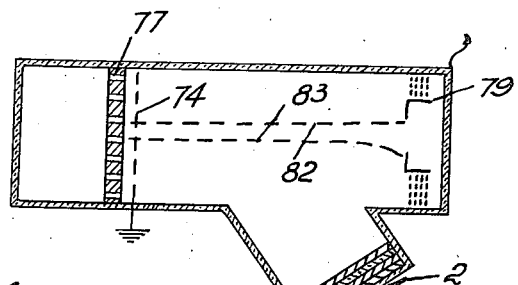
Fig. 5 represents a modification of the storage pick-up tube shown in Fig. 4.

It is obvious that the composite photocathode 21, the electron gun 79 and the perforated target 77 may be disposed in many different ways. One of such modifications is shown by the way of example only in Fig. 5. In this case the X-ray image converted into photoelectron image is projected on the side of the perforated target facing the electron gun. This arrangement allows deposition of the charge image on the target especially suitable for the modulation of the scanning electron beam.

My invention can be also used for intensification of images of invisible radiations, without storing them prior to their reading. In such a case the dielectric target has to have the conductivity allowing the stored charge to dissipate completely within a desired period of time. In this case operation of the storage tube and of X-ray source have to be continuous instead of being intermittent, as was described above.

The modification of the pick-up storage tube shown in Fig. 6 allows to improve the contrast and detail of stored images at the expense however of sensitivity of the device. In this modification a high velocity scanning electron beam is used instead of a slow electron beam described previously. The X-ray image of the examined object 2 is converted by the composite photocathode 21 into a photoelectron image. The photoelectron image is accelerated and focused by magnetic or electrostatic fields 60 on the composite target 61 having electron transparent, light reflecting layer 62, the fluorescent layer 63, transparent conducting layer 64, transparent dielectric layer 65 and photoemissive mosaic layer 66. The photoelectron image is converted in said target first into fluorescent image. The fluorescent image is transmitted through the conducting layer 64 and dielectric layer 65 to the photoemissive mosaic layer 66 in which it causes photoelectron emission. The photoelectrons are drawn away and as a result positive charge image is left on the mosaic layer 66 having the pattern of the original X-ray image. This charge image may be stored for a desired period of time because of dielectric properties of the target. When the X-ray image is to be read, scanning electron beam 70 of a high velocity from the electron gun 71 is activated and is scanning the photoemissive mosaic 66. The electron beam causes secondary electron emission 70a from said mosaic which is modulated by the pattern of the stored charge image on said mosaic. The secondary electrons are drawn away from the mosaic layer because of the positive potential of the collector which may be the second anode 72 and are converted over the resistance 67 into video signals. The scanning electron beam is controlled by deflecting fields 73. The deflecting fields and synchronizing circuits are not shown in detail, as they are well known in the art and would only serve to complicate the drawings. An increase in sensitivity of this pick-up storage tube can be obtained by giving a high negative bias to the conducting layer 64, connecting it with an outside source of the negative potential 68. The conducting layer 64 may be eliminated in some cases and the necessary potential may be applied to the reflecting layer 62 of metal. The materials for different layers of the composite photocathode and target may be the same as was described above.

In some cases it is advantageous to use a mesh screen electrode in the close proximity to the scanned side of the target 61 between said target and the electron gun 71. The mesh screen is connected to the source of the positive potential and helps to improve the secondary emission produced by the scanning beam and also to prevent detrimental redistribution of the secondary electrons on the target.

Figure 7:
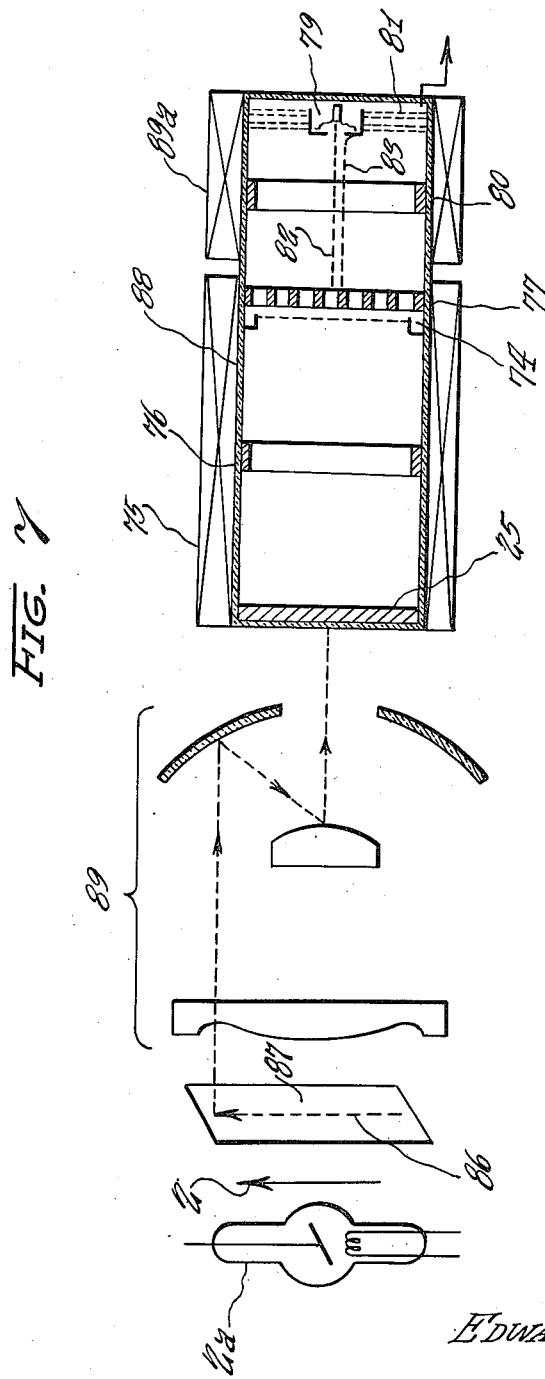
Fig. 7 shows a modification of the storage pick-up tube having optical means.

It is obvious that invisible radiation sensitive pick-up storage tube may also operate without a composite photocathode 21, although with a great sacrifice of sensitivity. This embodiment of my invention is shown in Figure 7. In such a case the invisible image is converted into a visible fluorescent image 86 in the fluorescent screen 87 positioned outside of the pick-up tube 88 and is focused on photoemissive photocathode 25 of said pick-up storage tube by suitable optical means 89. This arrangement is, however, very insensitive due to losses of light caused by the transmission through the optical system, which in refractive system amounts to 95% and in reflective optical system to 30% of light. The rest of the operation of the storage system will be the same as explained above and shown in Figure 4.

The sensitivity of invisible radiation pick-up storage tube can be markedly increased by the use of a storage phosphor for the fluorescent layer 5 and 23, in the composite photocathodes 16 and 21 or for the fluorescent layer 29 and 63 in the composite target 39 or 61. The invisible X-ray image is stored in said phosphor and is released therefrom in the form of fluorescent image only after irradiation with an additional source of radiation such as infra-red. In this case the visible light reflecting layer 4, and 22, or 28 and 62 obviously must be transparent to infra-red radiation. A thin layer of gold will be suitable for this purpose. Satisfactory phosphors for the storage of images are alkaline earth sulphides and selenides activated with cerium, samarium or europium, sulphides activated with lead or with copper or lanthanum oxysulphides with activators. In case image storage tube should serve for storage and detection of infra-red images, the photocathode should be irradiated with ultra-violet radiation from an extraneous source before the exposure to infra-red image. In such case the visible light reflecting layers obviously have to be transparent to ultra-violet light. The phosphor of the fluorescent layer may be the same as described above, that is such as of alkaline earth sulphides activated with lead or with copper. The storage phosphor can be also used in the fluorescent layer 29 and 63 of the composite target 39 or 61 as was described above. This arrangement is advantageous because in such case the storage phosphor is excited by the electron beam having the pattern of the X-ray image instead of by the invisible X-ray image itself and it is known that storage phosphors are much more sensitive to electrons than to X-rays. Another way of taking advantage of greater sensitivity of storage phosphors to electrons is to use them in a fluorescent layer 23a in the second stage composite screen 21a, see Fig. 3.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

What is claimed is:

1. A device for the storage of images comprising in combination photoelectric means for converting an image into a photoelectron image, a dielectric storage target comprising a conducting mesh screen and a dielectric layer having a planar shape, said dielectric layer having one side in contact with said mesh screen and the other side uncovered, said contact being substantially over the entire extent of the conducting surface of said mesh screen, said mesh screen having furthermore one side uncovered, means for projecting said photoelectron image on said target for storing said image on said target, means for producing an electron beam, means for decelerating said electron beam, said means for producing said electron beam being disposed on the side of said storage target opposite to said photoelectric means, and means for irradiating with said electron beam said target.

2. A device for the storage of images comprising in combination photoelectric means for converting an image into a phtoelectron image, a dielectric storage target comprising a conducting perforated screen and a dielectric layer mounted parallel to said photoelectric means, said dielectric layer having one side in contact with said conducting screen and the other side uncovered, said uncovered side of said dielectric layer facing said photoelectric means, means for projecting said photoelectron image on said target for storing said image on said dielectric layer, means for producing an electron beam to irradiate said target, means for decelerating said electron beam, said means for producing said electron beam being disposed on the side of said storage target opposite said photoelectric means and means for converting said stored image on said dielectric layer into electrical signals.

3. A device for the storage of images as defined in claim 1, in which said means for converting an image into a photoelectron image comprise fluorescent means.

4. A device for the storage of images comprising in combination photoelectric means for converting an image into a photoelectron image, a dielectric storage target comprising a conducting perforated screen and a dielectric layer having a planar shape, said dielectric layer having one side in contact with said conducting screen substantially over the entire extent of conducting surface of said screen and the other side uncovered, said uncovered side of said dielectric layer facing said photoelectric means, said perforated screen having furthermore one side uncovered, a mesh screen disposed in close proximity to said storage target, means for projecting said photoelectron image on said target for storing said image on said dielectric layer, means for producing an electron beam to irradiate said target, said means for producing said electron beam being disposed on the side of said storage target opposite said photoelectric means, means for decelerating said electron beam, and means for converting said stored image on said dielectric layer into electrical signals.

5. A device for the storage of images comprising in combination photoelectric means for converting an image into a photoelectron image, a dielectric storage target comprising a conducting perforated screen and a dielectric layer mounted parallel in relationship to said photoelectric means, said dielectric layer having one side in contact with said conducting screen and the other side uncovered, said contact being substantially over the entire extent of the conducting surface of said perforated screen, said perforated screen having furthermore one side uncovered, means for projecting said photoelectron image on said target for storing said image on said dielectric layer, means for producing an electron beam, said means for producing said electron beam being disposed on the side of said storage target opposite said photoelectric means, means for decelerating said electron beam, means for scanning with said electron beam across said target and means for converting said stored image on said dielectric layer into electrical signals.

6. A device for the storage of images comprising in combination photoelectric means for converting an image into a photoelectron image, a dielectric storage target comprising a conducting perforated screen and a dielectric layer having a planar shape, said dielectric layer having one side in contact with said conducting screen and the other side uncovered, said contact being substantially over the entire extent of the conducting surface of said perforated screen, said perforated screen having furthermore one side uncovered, means for projecting said photoelectron image on said target for storing said image, means for producing an electron beam to irradiate said target, said means for producing said electron beam being disposed on the side of said storage target opposite said photoelectric means, means for decelerating said electron beam, and means for converting said stored image into electrical signals, said means for producing said electron beam also operating to discharge said stored image.

7. A device for the storage of images comprising in combination photoelectric means for converting an image into a photoelectron image, a perforated dielectric storage target comprising a conducting perforated screen and a dielectric layer mounted parallel in relationship to said photoelectric means, said dielectric layer having one side in contact with said conducting screen and the other side uncovered, means for projecting said photoelectron image on said target for storing said image on said dielectric layer, means for producing an electron beam to irradiate said target, means for decelerating said electron beam, said means for producing said electron beam being disposed on the side of said storage target opposite said photoelectric means and means for converting said stored image on said dielectric layer into electrical signals.

8. A device for the storage of images comprising in combination photoelectric means for converting an image into a photoelectron image, a perforated dielectric storage target, means for projecting said photoelectron image on said target for storing said image on said target, means for producing an electron beam, said means for producing said electron beam being disposed on the side of said storage target opposite said photoelectric means, means for decelerating said electron beam, means for scanning with said electron beam across said target and means for converting said stored image into electrical signals.

9. A device as defined in claim 8, which comprises in addition a mesh screen disposed in close proximity to said storage target.

10. A device for the storage of images comprising in combination fluorescent means and photoelecrtic means for converting an image into a photoelectron image, a dielectric storage target comprising a conducting perforated screen and a dielectric layer having a planar shape, said dielectric layer having one side in contact with said conducting screen and the other side uncovered, said contact being substantially over the entire extent of the conducting surface of said perforated screen, said perforated screen having furthermore one side uncovered, means for projecting said photoelectron image on said target for storing said image, means for producing an electron beam to irradiate said target, said means for producing said electron beam being disposed on the side of said storage target opposite said photoelectric, means for delecerating said electron beam, and means for converting said stored image into electrical signals.

11. A device for the storage of images comprising in combination fluorescent means and photoelectric means for converting an image into a photoelectron image, a dielectric storage target, means for projecting said photoelectron image on said target for storing said image on said target, means for producing an electron beam, said means for producing said electron beam being disposed on the side of said storage target opposite said photoelectric means, means for decelerating said electron beams, means for scanning with said electron beam across said target and means for converting said stored image into electrical signals.

12. A device for the storage of images comprising in combination fluorescent means and photoelectric means for converting an image into a photoelectron image, a perforated dielectric storage target comprising a conducting mesh screen and a dielectric layer, said dielectric layer having one side in contact with said mesh screen and the other side uncovered, means for projecting said photoelectron image on said target for storing said image, means for producing an electron beam, said means for producing said electron beam disposed on the side of said storage target opposite said photoelectric means, means for decelerating said electron beam, means for irradiating with said electron beam said target and means for converting said stored image into electrical signals.

13. A device for the storage of images comprising in combination a composite photocathode having fluorescent means and photoelectric means for converting an image into a photoelectron image, a dielectric storage target comprising a conducting perforated screen and a dielectric layer mounted parallel in relationship to said photoelectric means, said dielectric layer having one side in contact with said conducting screen and the other side uncovered, said contact being substantially over the entire extent of the conducting surface of said perforated screen, said perforated screen having furthermore one side uncovered, means for projecting said photoelectron image on said target for storing said image on said target, means for producing an electron beam, said means for producing said electron beam being disposed on the side of said storage target opposite said photoelectric means, means for decelerating said electron beam, means for irradiating with said electron beam said target to modulate said electron beam with said stored image and means for converting said modulated beam into electrical signals.

References Cited in the file of this patent

UNITED STATES PATENTS

| | | |
|---|---|---|
| 2,061,113 | Sukumlyn | Nov. 17, 1936 |
| 2,153,614 | Coeterier et al. | Apr. 11, 1939 |
| 2,199,438 | Lubszynski | May 7, 1940 |
| 2,234,328 | Wolf | Mar. 11, 1941 |
| 2,257,942 | Farnsworth | Oct. 7, 1941 |
| 2,258,294 | Lubszynski et al. | Oct. 7, 1941 |
| 2,297,478 | Kallmann | Sept. 29, 1942 |
| 2,305,452 | Kallmann et al. | Dec. 15, 1942 |
| 2,451,005 | Weimer et al. | Oct. 12, 1948 |
| 2,495,697 | Chilowsky | Jan. 31, 1950 |
| 2,523,132 | Mason et al. | Sept. 19, 1950 |
| 2,525,832 | Sheldon | Oct. 17, 1950 |
| 2,550,316 | Wilder | Apr. 24, 1951 |
| 2,555,545 | Hunter | June 5, 1951 |